CHARLES LANG, OF NEW YORK, N. Y.

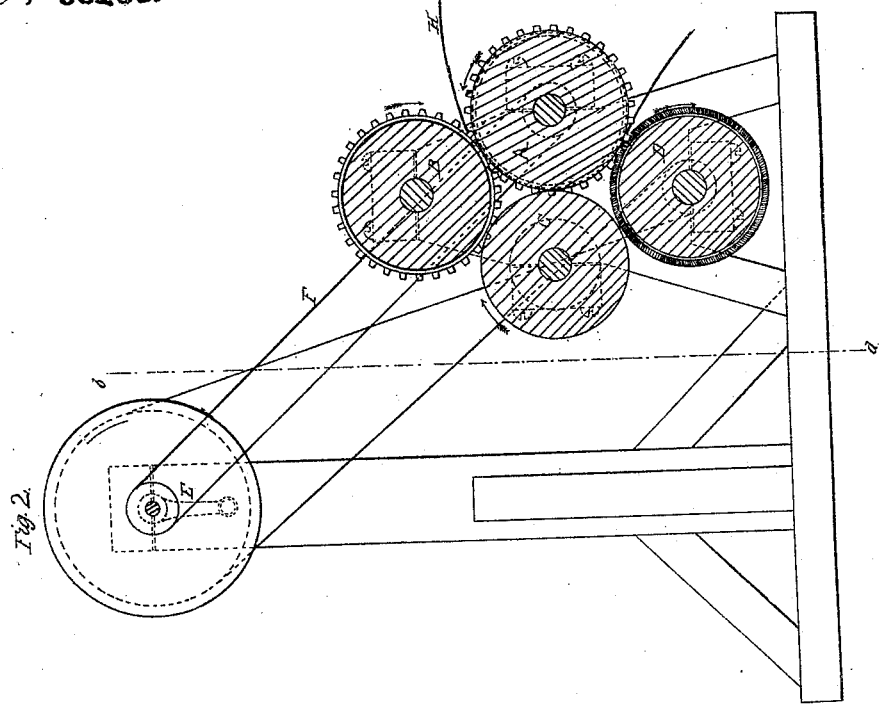
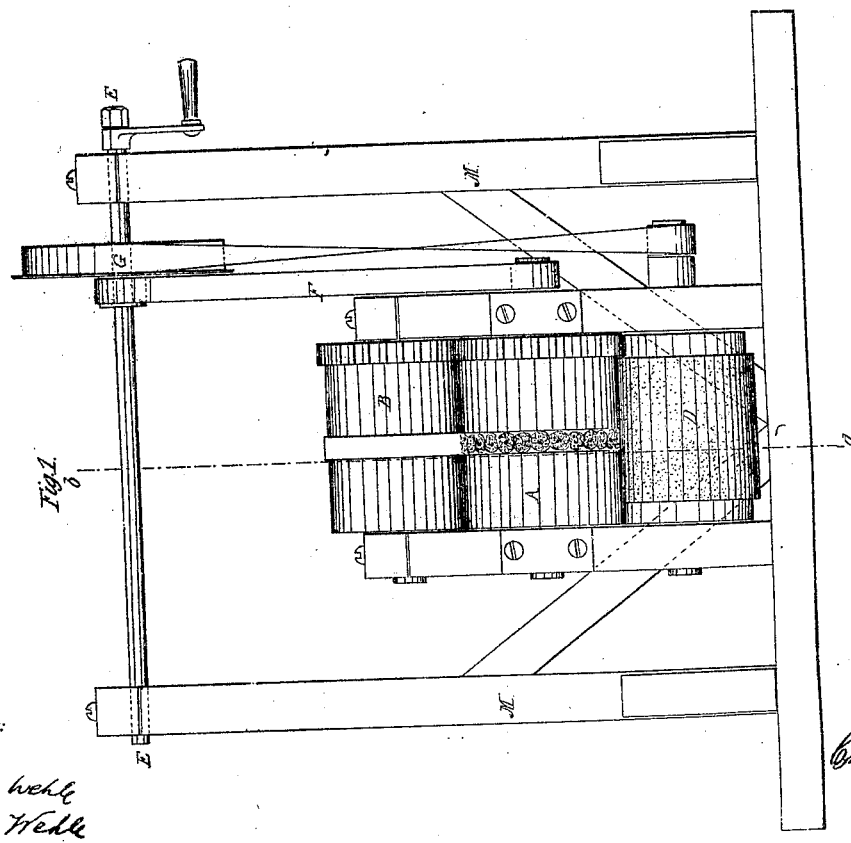

*Letters Patent No. 63,263, dated March 26, 1867.*

MACHINE FOR EMBOSSING AND PERFORATING PAPER, &c.

*The Schedule referred to in these Letters Patent and making part of the same.*

TO WHOM IT MAY CONCERN:

Be it known that I, CHARLES LANG, of the city, county, and State of New York, did invent a new and useful Machine for Manufacturing Box-Edgings, Lace Curtains, Edgings on Under Garments, and other similar embossed and perforated goods out of paper, linen, cotton-lined paper, paper mixed with cotton threads or linen threads, cotton cloth, linen cloth, or similar material; and I do hereby declare the following to be a full and exact description thereof, reference being had to the annexed drawing, making a part of this specification, in which—

Figure 1 represents a front view of my invention.

Figure 2, a cross-section thereof through line *a b* of fig. 1.

The same letters of reference mark the same parts in both figures.

The nature of my invention consists in constructing a machine composed of several rollers, two of which contain the design, one raised and one sunk, between which said two rollers the strip of paper, &c., is passed, and by pressure the design is embossed and the paper perforated and cut during its passage, substantially as hereinafter described.

To enable others skilled in the art to make and use my invention I will proceed to describe the same more particularly.

M M represent the two vertical frame pieces through which the main shaft E E is inserted, and to which shaft two pulleys are fixed, one of said pulleys being connected with the roller A, by a direct belt, F, and the other by a crossed belt, G, with the brush-roller or wheel-brush D. The rollers A, B, C, and D are connected, as shown in the drawing. Rollers A and B are geared into each other. The direction in which each of the rollers is made to move is indicated by the arrows. H represents the strip of paper, linen, or similar material during its passage through the rollers. Roller A is made of steel, tempered or soft, as may be required according to design, and upon its surface the design to be produced on the paper, &c., is cut, depressed, or sunk. The elevated parts which will produce the open work are cut so as to leave a knife-edge around the design, as shown in fig. 1. Smaller parts or points, &c., may be left as a flat surface to work as a punch. Roller B is made of pasteboard, soft metal, such as type metal, or similar material, and for the purpose of embossing is an opposite die or male-die roller to A. The same can be made by having the roller made a little larger, and by rotating roller A and screwing the top boxes downwards until the roller B has forced itself sufficiently into roller A to make a good proof. Roller C is made of soft steel, copper, hard rubber, or of similar hard substance; its surface is perfectly flat for the purpose of cutting the paper. Roller D is a wheel-brush made of fine wire or hard bristles for the purpose of brushing away and removing pieces which may adhere to roller A.

This machine is used by placing a strip of paper, &c., between the rollers A and B, and turning the cr? E in the direction of the arrow. Belt F will move roller A in the direction as shown by arrow. Roller B being geared to roller A will move in the opposite direction, thereby the paper will be carried around and embos by roller B brought in contact with roller C, the surface of which is set closely to surface of roller A bef any paper is placed between them, and consequently it will cut through and press away the thickness of p? placed between the rollers. The wheel-brush D is intended to remove loose pieces which may stick to roller The machine may be operated in other ways, accomplishing the same effects. The roller B may be placed journals of roller D, or one in the place of roller B, whereby the paper will be first cut, and by being move will be embossed afterwards.

By means of this machine certain goods may be manufactured out of paper, linen, or similar material above mentioned, such as box-edgings, lace curtains, edging on under garments, and generally goods which require embossing and perforating; the strip of paper being placed between the rollers will come out as a finished article, whereby said goods may be made rapidly and with little expense.

What I claim as new, and desire to secure by Letters Patent, is—

The new mode of manufacturing embossed and perforated goods out of paper, linen, cotton-lined paper, paper mixed with cotton threads or linen threads, cotton cloth, linen cloth, or similar material, by means of the machine substantially as described; the principal parts of which said machine consist of three rollers, two of which contain the design depressed and raised, and the third acting by its pressure as perforator, between which said rollers a strip of paper or other material is passed, and is embossed, perforated, and cut during its passage, substantially for the purpose set forth.

CHARLES LANG.

Witnesses:
CHAS. WEHLE,
HENRY WEHLE.